United States Patent [19]

DeBruler et al.

[11] Patent Number: 5,155,858
[45] Date of Patent: Oct. 13, 1992

[54] TWIN-THRESHOLD LOAD-SHARING SYSTEM WITH EACH PROCESSOR IN A MULTIPROCESSOR RING ADJUSTING ITS OWN ASSIGNED TASK LIST BASED ON WORKLOAD THRESHOLD

[75] Inventors: Dennis L. DeBruler, Downers Grove, Ill.; Allen D. Fergeson, Ashville, Ohio; F. Joseph Glynn, Naperville; Gilbert A. VanDine, West Chicago, both of Ill.

[73] Assignee: AT&T Bell Laboratories, Murray Hill, N.J.

[21] Appl. No.: 726,143

[22] Filed: Jun. 24, 1991

Related U.S. Application Data

[63] Continuation of Ser. No. 263,580, Oct. 27, 1988, abandoned.

[51] Int. Cl.⁵ .............................................. G06F 15/16
[52] U.S. Cl. .................................. 395/800; 395/200; 395/650; 364/229; 364/229.3; 364/230; 364/230.3; 364/230.1; 364/281.3; 364/DIG. 1; 340/825.05
[58] Field of Search ... 364/200 MS File, 900 MS File; 340/825.5, 825.51, 825.05; 370/85.5, 85.6, 85.15; 395/800, 200, 650

[56] References Cited

U.S. PATENT DOCUMENTS

| | | | |
|---|---|---|---|
| 3,587,054 | 6/1971 | Byrne | 340/172.5 |
| 4,011,545 | 3/1977 | Nadir | 340/172.5 |
| 4,228,496 | 10/1980 | Katzman et al. | 364/200 |
| 4,363,094 | 12/1982 | Kaul et al. | 364/200 |
| 4,393,468 | 7/1983 | New | 364/736 |
| 4,413,318 | 11/1983 | Herrington | 364/200 |

(List continued on next page.)

OTHER PUBLICATIONS

A. D. Fergeson et al., "The AT&T Interprocess Message Switch Architecture", *Proceedings of the IEEE International Communications Conference*, Jun. 1987, pp. 11.5.1–11.5.5.

R. M. Genke et al., "No. 1 ESS TM Call Store-A 0.2 Megabit Ferrite Sheet Memory":, *The Bell System Technical Journal*, vol. 43, Part 1 of 2, Sep. 1964, pp. 2147–2191.

R. Alonso et al., "Sharing Jobx Among Independently Owned Processors", *Proceedings 8th International Conference On Distributed Computing Systems*, San Jose U.S., Jun. 13, 1988, pp. 282–287.

D. L. Eager et al., "Adaptive Load Sharing In Homogeneous Distributed Systems", *IEEE Transactions On Software Engineering*, vol. 12, No. 5, May 1986, pp. 662–675.

*Primary Examiner*—Thomas C. Lee
*Assistant Examiner*—William M. Treat
*Attorney, Agent, or Firm*—Werner Ulrich

[57] ABSTRACT

A method and apparatus for allocating work requests among a plurality of processors attached to a data ring. Each processor has an interface for communicating with the data ring. The interface for each work request accepting processor has a memory defining a plurality of destination addresses for which the associated processor will accept work requests. Each type of work request has several destination addresses corresponding to different priority levels. If that processor becomes too heavily loaded, it will delete one or more of the destination addresses for which the interface will accept work requests. Such a deletion results in the processor only accepting higher priority requests for a type of work request. Work request generating processors detect work request messages which have not been accepted when they return on the ring. Such messages are then retransmitted at a higher priority, and with a longer delay between consecutive transmissions of the work request message. Advantageously, such an arrangement permits each processor to regulate its own load based on its own measurements of work activity, while permitting repeated attempts to get each work request accepted.

17 Claims, 5 Drawing Sheets

U.S. PATENT DOCUMENTS

| | | | |
|---|---|---|---|
| 4,418,382 | 11/1983 | Larson et al. | 364/200 |
| 4,491,916 | 1/1985 | Vallhonrat | 364/200 |
| 4,495,570 | 1/1985 | Kitajima et al. | 364/200 |
| 4,654,654 | 3/1987 | Butler et al. | 340/825.5 |
| 4,663,706 | 5/1987 | Allen et al. | 364/200 |
| 4,665,517 | 5/1987 | Widmer | 370/86 |
| 4,680,757 | 7/1987 | Murakami et al. | 370/89 |
| 4,698,629 | 10/1987 | Mori et al. | 340/825.05 |
| 4,714,923 | 12/1987 | Tassle et al. | 340/825.06 |
| 4,752,924 | 6/1988 | Darnell et al. | 370/86 |
| 4,769,813 | 9/1988 | Lenart | 370/86 |
| 4,777,591 | 10/1988 | Chang et al. | 364/200 |
| 4,792,947 | 12/1988 | Takiyasu et al. | 370/86 |
| 4,807,281 | 2/1989 | Weber et al. | 379/269 |
| 4,814,979 | 3/1989 | Neches | 364/200 |
| 4,827,499 | 5/1989 | Warty et al. | 379/58 |
| 4,890,260 | 12/1989 | Chuang et al. | 365/49 |
| 4,925,311 | 5/1990 | Neches et al. | 364/200 |
| 4,949,338 | 8/1990 | Albal et al. | 370/85.6 |
| 5,031,089 | 7/1991 | Liu et al. | 364/200 |
| 5,053,950 | 10/1991 | Naganuma et al. | 364/200 |

TWIN-THRESHOLD LOAD-SHARING SYSTEM WITH EACH PROCESSOR IN A MULTIPROCESSOR RING ADJUSTING ITS OWN ASSIGNED TASK LIST BASED ON WORKLOAD THRESHOLD

This application is a continuation of application Ser. No. 07/263,580, filed on Oct. 27, 1988 now abandoned.

TECHNICAL FIELD

This invention relates to arrangements for allocating load to the processors of a multiprocessor system.

PROBLEM

Distributed multiprocessing systems frequently have the characteristic that any of a plurality of processors may execute a particular task. The plurality of processors is provided to handle a peak processing load. In order to handle this load efficiently, all processors must carry their share of the load which requires that no processor be overloaded when another processor is not yet fully loaded.

A common arrangement for exchanging messages among processors of a multiprocessor system is to connect each of these processors, via an interface, to a data ring. In the terminology common to data rings, the various processors connected to the ring are called "nodes" on the ring. In the discussion which follows, the terms "processors" and "nodes" are used interchangeably. A processor interface, upon reception of messages from the data ring, directs any message having an address identifying its own processor to that processor, and forwards all other messages to the next processor interface on the ring. In addition, each processor interface is prepared to recognize messages originated by its associated processor, which when received from the ring by the interface indicate that a message has passed completely around the ring without finding a recipient and should generally be deleted.

When such rings are used, a problem arises in allocating ones of a plurality of similar tasks to ones of the processors on the ring. Unless each processor that generates work requests for the execution of a task maintains an indication of the load currently being carried by each process server, i.e., work-receiving processor, and assigns tasks to each such processor on the basis of these load indications, load will, in general, not be distributed to those processors most easily capable of handling that load. Such arrangements to inform each work-requesting processor of the status of each task execution processor are inefficient. Another alternative is to assign to one processor the task of allocating work to all processors. This arrangement presents problems of reliability, in case the one processor fails, and is also inefficient, requiring multiple messages to allocate a task. Further, the allocating processor may become a system bottleneck and limit system capacity. A problem of the prior art therefore is that there are no efficient arrangements for allocating work to each of a plurality of processors while guaranteeing that if any processor is able to accept this work request, that processor will be the one allocated to carry out the task. An additional problem is, in the case of failure of one or more of the process servers, the lack of an efficient mechanism for automatically assigning the tasks only to the remaining in-service process servers.

SOLUTION

The foregoing problems are solved, and an advance is made in the art, in the illustrative embodiment of our invention by providing each processor node on a ring with the capability of accepting work request messages having one of a plurality of addresses stored by the processor node, and by further providing each such processor node with the capability of adding and deleting addresses from that list. A processor that generates a work request message prefixes such a message with an address. The first processor node on the ring that has that address in its list will accept that message, carry out the work requested therein, and prevent the propagation of the work request message to subsequent processor nodes.

In one embodiment of the invention, processor nodes delete addresses from their list when they have accumulated a threshold number of requests for work, and add that address back in their list when the number of accumulated requests goes below the threshold. Advantageously, such an arrangement shields an overloaded processor node from accepting additional work and allows another processor to accept the message and process the request.

In one embodiment of the invention, each of a plurality of processor nodes acting as process servers attached to a data ring has an interface comprising a memory for storing addresses for work request messages which the processor is prepared to receive. For each received message, the processor stores the work request in a queue and records the number of work requests accumulated in the queue. If this number exceeds one threshold then the processor deletes an address (defined as the Low Priority address) from the interface memory so that only work requests having an address of higher priority will be accepted henceforth. Advantageously, such an arrangement shields a heavily loaded processor from accepting additional low priority work requests, while still permitting it to accept high priority work requests. In one embodiment, the memory is a bit map. Advantageously, a bit map can store one bit of data for each of a large number of addresses within a limited size memory; these addresses would include a set of addresses and the interface may be initialized to respond to any subset of this set. In this embodiment, a subset of these addresses corresponds to multiple levels of priority for a given type of task, and interfaces are typically initialized to respond to a plurality of such subsets.

In this embodiment, the processors which transmit work request messages recognize when a request has not been accepted by any of the serving processors because that work request message returns via the ring to the transmitting processor. The transmitting processor then tests whether the work request can be sent at a priority higher than the previous attempt, and if so, retransmits the request. If the priority cannot be increased, then the transmitting processor arranges to retransmit the message after a delay. Subsequent retransmissions are delayed by longer intervals until a decision is made that the attempt to process the work request should be abandoned.

In this embodiment, each process server is a program-controlled processor containing in its memory a queue of work requests to be processed, an indication of the number of entries in the work queue for adjusting the list of addresses in order to accept only high priority or all priority requests and, in an associated ring interface, the current one of the dynamically changing list of addresses which controls the priority level of request messages that will be accepted by that processor. Advantageously, the combination of the above-described priority addressing arrangement (which assures that all process servers are maximally utilized) and the rescheduling algorithm (which covers a wide range of reattempt times) provides a highly effective strategy for managing peaks of work request traffic over a wide range of peak severity and duration.

DETAILED DESCRIPTION

Figure 1:
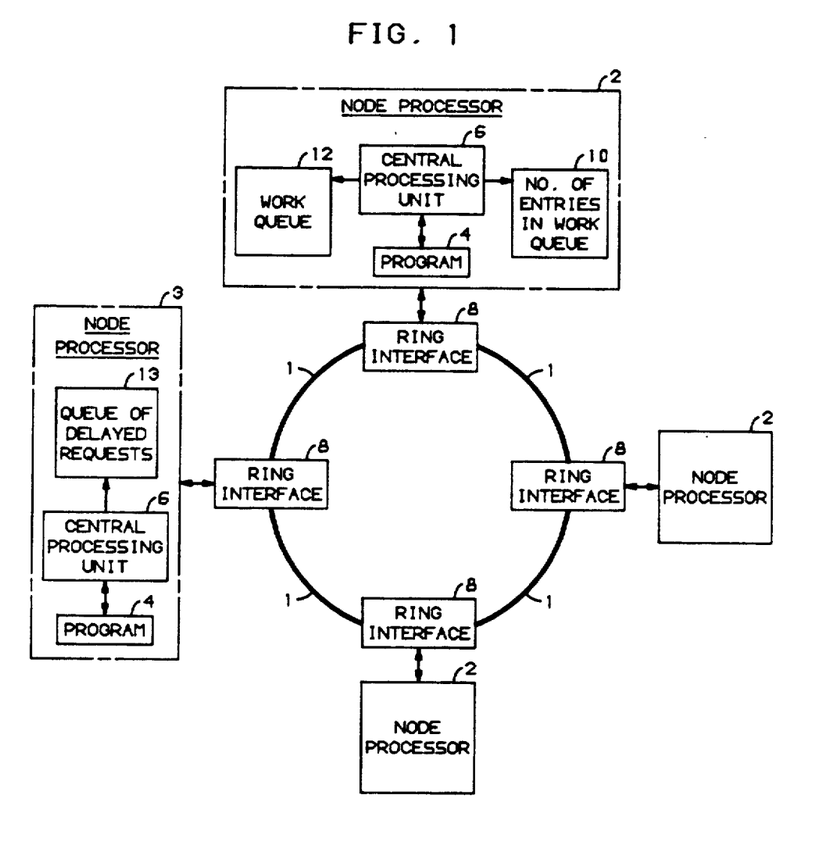
FIG. 1 is a block diagram of a data ring and processors attached to that data ring.
Figure 6:
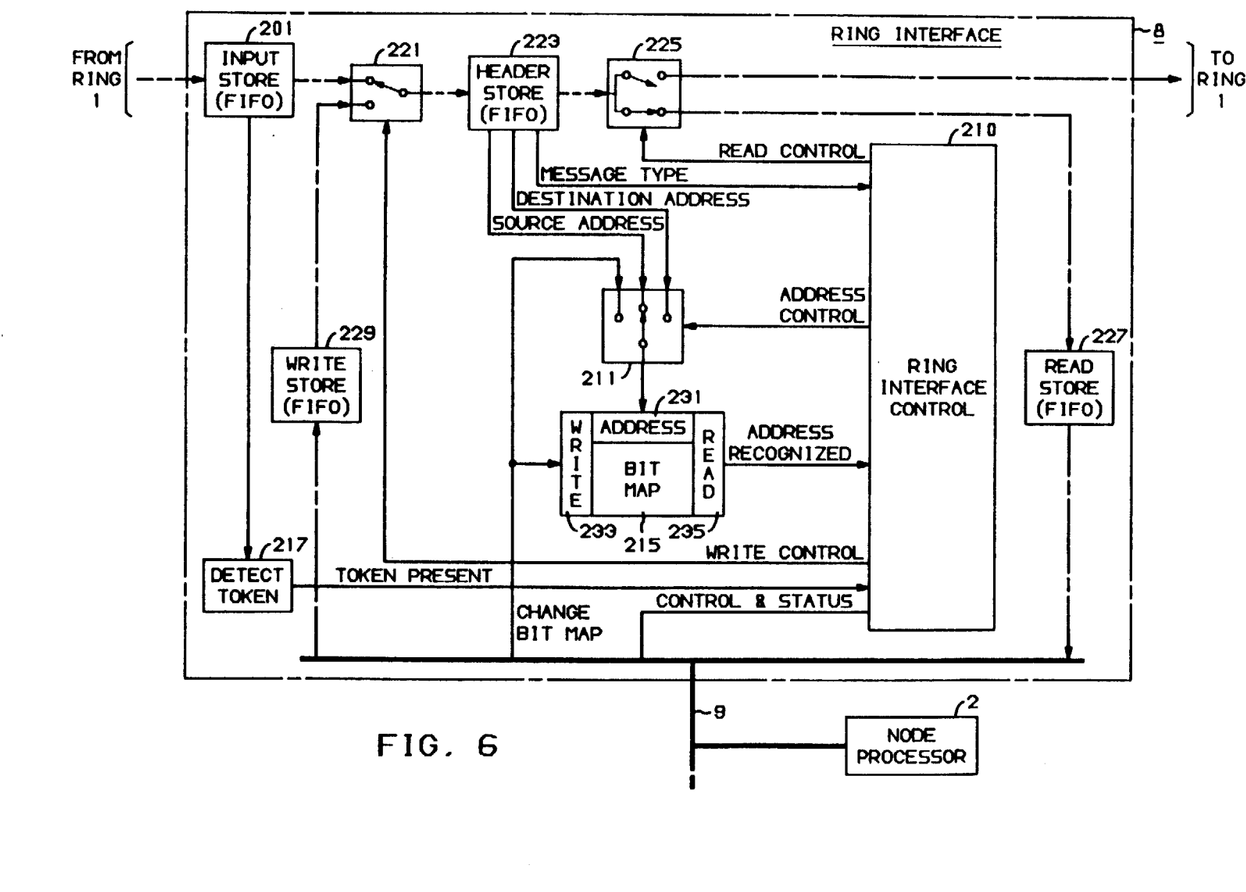
FIG. 6 is a block diagram of the circuitry for interfacing between one of these processors and the data ring.

FIG. 1 is a block diagram of a data ring 1 showing a processor 3 for generating work requests and transmitting such requests to data ring 1 and three processors 2 for accepting work requests from data ring 1. Each of these processors has an associated ring interface 8 for transmitting data received from the ring to the processor, for transmitting data from the processor to the ring, and for transmitting data received from the ring to the next interface. The details of block 8 are shown in FIG. 6.

In this example, each processor 3 generates only one type of work request, albeit a type of work request for which work request messages can be sent on different priority levels. Each priority level for that type of work request represents one class of work request. Further, each processor 2 accepts only one type of work request and has a list of destination addresses for different priorities of that type. When the processor is prepared to accept any priority of this task, all of these addresses are in the address list of the associated memory of interface 8 of that processor. When one of more priority levels are no longer accepted, then one or more of these addresses are removed from the list stored in the associateve memory of interface 8. Each member of the list corresponds to one class of work request.

Each of the processors comprises a central processing unit 6 controlled by a program 4. Processor 3 also has a queue of delayed requests comprising requests which were not accepted initially by any of the processors 2 and are being delayed prior to retransmission. Each of the processors 2 contains a work queue 12 for storing requests to perform a task and an indication 10 of the number of entries in that work queue. As the number of entries in the work queue changes, reflecting a greater or lesser accepted future load, the processor adjusts the priority of work requests to be accepted by adding or deleting addresses from the list of addresses of work requests to be accepted. That list is stored in interface 8 and is used to steer work request packets to the associated processor or to send the work request packets on to the next processor interface. The interface 8 associated with processor 3 serves to recognize when a work request message has completely circled the ring without being accepted by any processor 2. When this happens, processor 3 recognizes that the work request has not been accepted and, as discussed with respect to FIG. 3, thereupon retransmits the request with a different address, specifically the one having the next higher priority than that of the previous request. If the previous request had been at the highest priority, processor 3 queues that work request in queue 13 for subsequent retransmission.

Figure 2:
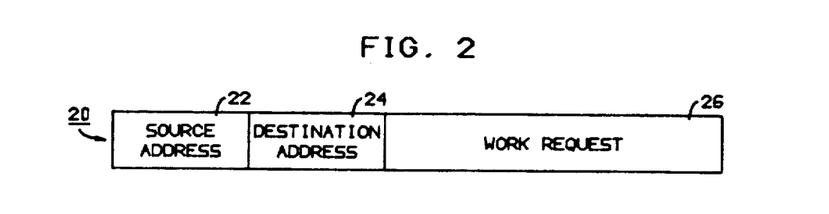
FIG. 2 is the layout of a work request data message.

FIG. 2 is a layout of a work request packet 20. This packet comprises a transmitting processor address 22 used by ring interface 8 of processor 3 to recognize packets that have been transmitted over the entire ring without having been accepted by any of the processors 2. The packet also includes a destination address 24 used by any of the interfaces 8 of the processors 2 to determine whether that packet is destined for its associated processor. Finally, the packet includes the details of the work request 26 which provide data so that a processor 2 may execute the tasks requested by processor 3.

Figure 3:
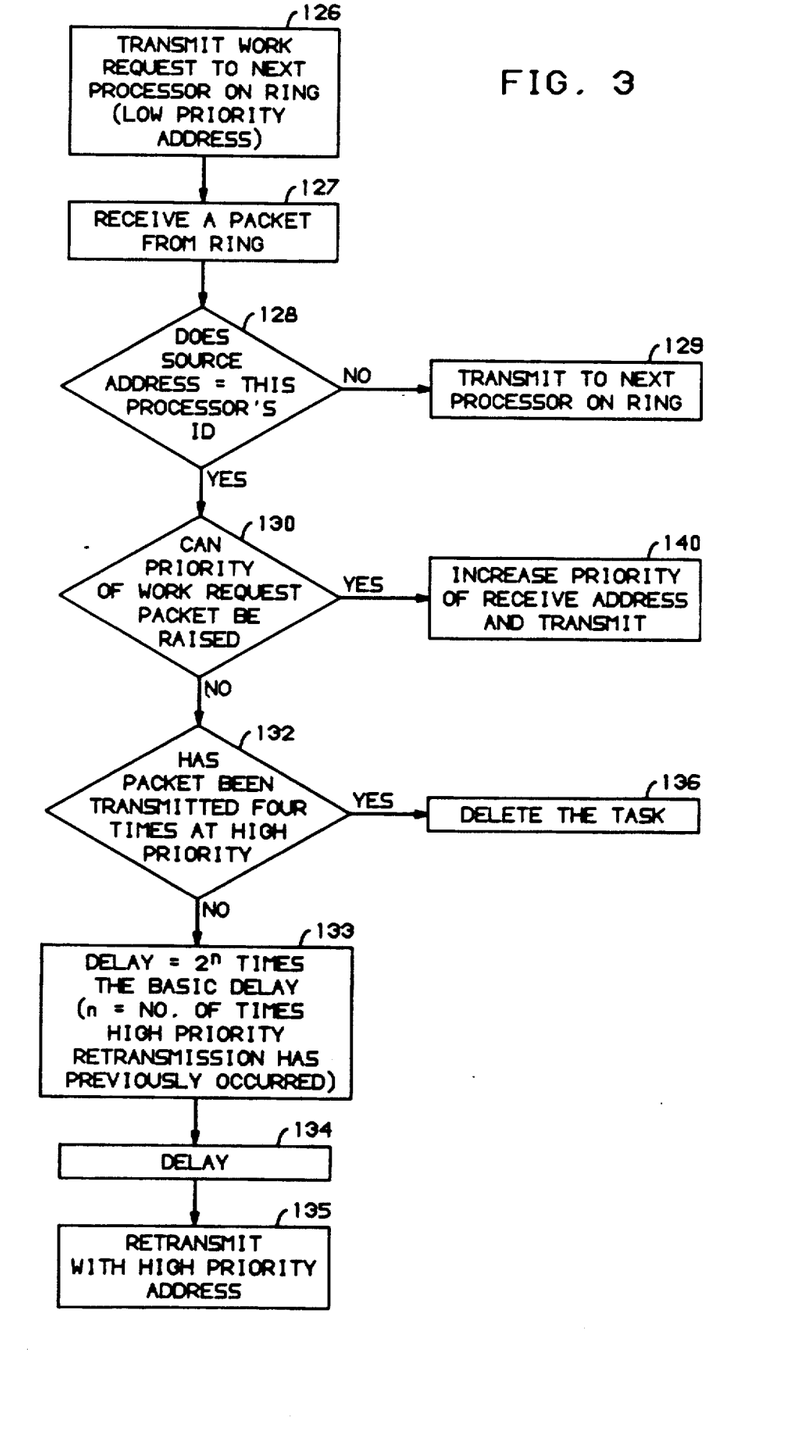
FIG. 3 is flow diagram of the actions performed by a processor when it requests work.

FIG. 3 is a flow diagram of the processing performed by processor 3. Processor 3 first transmits a work request to the next processor on the ring (action block 126) using the lowest priority address for that class of packets. For any packet received in the interface of processor 3 (action block 127), a check is made in the interface 8 of processor 3 whether the transmitter (source) address is the source address or identification of this processor (action block 128). If not, then the packet is transmitted to the next processor on the ring (action block 129). If the source address does match the processor identification, i.e., if there is a source match, then a test is made (decision block 130) whether the priority of the work request packet can be raised. Work request packets which have a naturally high priority may be transmitted with a higher priority than initially provided if, for example, such a task was not accepted in its initial attempts, and is to be reattempted after a delay. If the priority can be raised, then the priority of the packet is increased by changing the destination address to reflect the next higher priority and the packet is retransmitted (action block 140). If the priority of the packet cannot be raised, i.e., it was already sent at the highest allowed priority for that request, then a check is made whether the packet has been transmitted four times (test 132) at the highest priority allowed for that packet. The highest allowed priority for a particular packet may be low priority if the request is an inherently low priority work request, for example, a request from a low priority client. If the packet has been sent four times at its highest allowed priority, the task is deleted (action block 136) since such a situation represents a massive overload in which tasks must be discarded because there are too many to process. If the packet has been transmitted fewer than four times at the highest priority for that packet, then the delay before the next transmission of that packet is a binary multiple of a basic delay so that the delays for retransmissions after the first are doubled from the previous delay (action block 133). Following that delay (action block 134), that packet is retransmitted (action block 135) at the highest priority for that packet so that delayed job will have priority over new jobs that have not been delayed.

Figure 4:
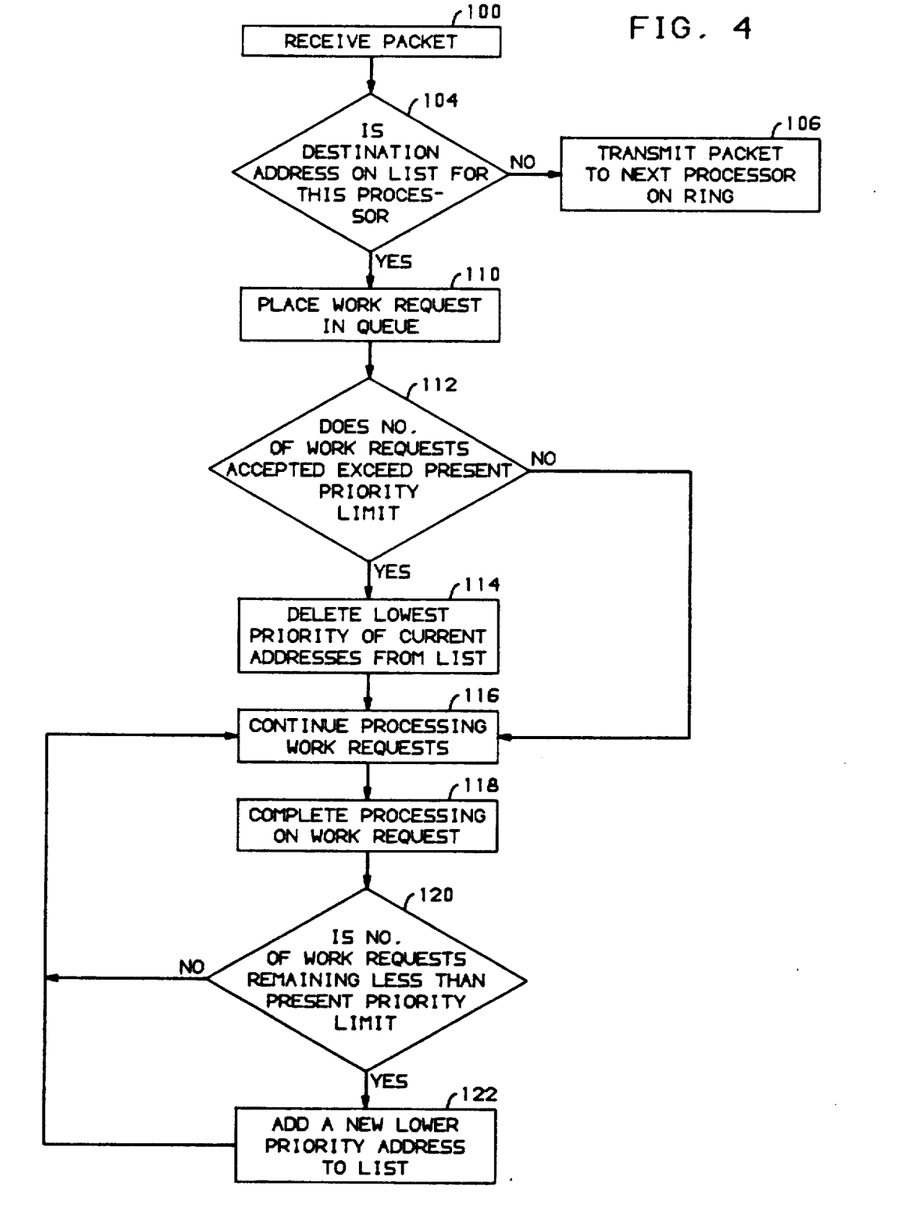
FIGS. 4 and 7 are diagrams of actions performed by a processor for accepting work requests.
Figure 7:
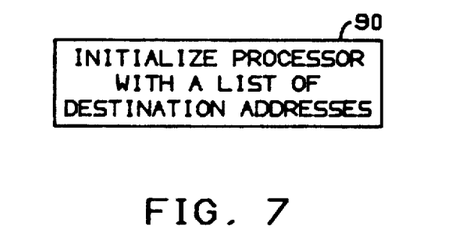

The actions of the process servers, or work request processing processors 2 are shown in FIG. 4. A packet is received in the interface 8 associated with a processor 2 (action block 100). There, the destination address is matched (test 104) with the list of addresses for which this processor will accept the associated work request. If there is no match, then the packet is transmitted by the interface to the next interface in the ring (action block 106). If there is a match, the packet is transmitted to the associated processor 2 and is placed in that processor's work request queue (action block 110). A test 112 is made to see whether the number of work requests accepted in the work request queue now exceeds the limit or upper threshold for the presently lowest priority level. If so, then the address associated with that lowest priority level is deleted from the list of addresses for which work request packets are accepted (action block 114). After the packet has been accepted, processing of work requests continues in processor 2 (action block 116). When the processing of a work request has been completed (action block 118) a test is made of whether the number of work requests remaining in the queue is less than the limit or lower threshold associated with the presently lowest priority (test 120). If so, a new, lower priority request address is added to the list of addresses in the interface 8 of processor 2. Subsequently, the processing of work requests is continued (action block 116). Each process server is initially assigned a list of destination addresses for which it will accept work requests, as shown in action block 90, FIG. 7. Members of this list are deleted and reinserted in accordance with the steps described above.

More than one address may be assigned to a given type of task at one priority level. If this is done, each of two or more processors 3 may assign different addresses to the same type of task. Then processors 2 may add or delete individual addresses or all of the addresses for a specific type of task and priority as required to fine tune the balancing of the load. Alternatively and additionally, different addresses may be assigned for long and short work requests of the same general task types, thus dividing one general task type into two subtypes, which are effectively treated as two different task types.

Processors may serve more than one type of task. One way of distributing tasks to serving processors is to initialize each interface by assigning one or more different lists of addresses; each such list of addresses is associated with a different task type, and would be administered in essentially the same way discussed previously for the single task. For example, short tasks might be accepted under moderate load conditions whereas lengthy ones would not, or tasks that free up memory would be accepted while ones that use up memory would not.

Figure 5:
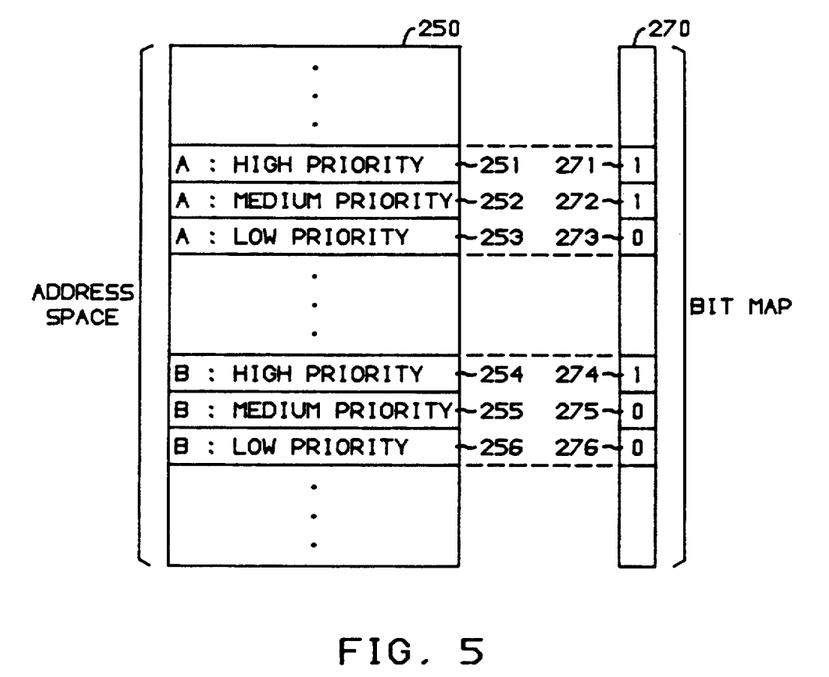
FIG. 5 illustrates the virtual address space and a corresponding bit map for permitting the processors to select the work requests that they will accept.

FIG. 5 illustrates a bit map used by each processor to decide whether or not to accept a work request received from the ring. Work functions are divided into groups such as A, B, etc., each representing one type of task. Requests may be accepted for each group as appropriate: high priority, medium, and low priority; high and medium priority only; high priority only; or none. For each group of tasks and each priority, one address is reserved. Corresponding to each address, one bit of storage in a bit map 270 is dedicated. If the bit in the bit map is set to one, then the corresponding task and priority may be accepted by the processor. If it is set to zero, then the corresponding task and priority will be rejected. FIG. 5 shows a layout of virtual address space including addresses 251, 252, and 253 for function A, high priority, medium priority, and low priority, respectively, and addresses 254, 255, 256 for functions B, high priority, medium priority, and low priority, respectively. The bits corresponding to the A functions are 271, 272, and 273 and are illustrated in bit map 270 as being in the state 1, 1, and 0, respectively. This indicates that the associated processor will accept high and medium priority requests for function group A, but will not accept low priority requests. Similarly, bits 274, 275, and 276 correspond to the B function, high priority, medium priority, and low priority requests and are marked 1, 0, 0, indicating that only B high priority tasks will be accepted.

FIG. 6 is an expansion of the ring interface, block 8 of this exemplary embodiment. The interface is connected to ring 1 at an input connected to an input store 201 and at an output connected to a switch 225. The interface is connected to node processor 2 via the node processor bus 9. The interface is controlled by ring interface control 210 which receives Token Present information from the Token Detect 217, Address Recognized information from the bit map 215, and various control signals from the node processor 2. The token detector 217 is connected to the input store 201 in order to recognize the presence of a token in that store. There is only one token in the ring, and the ring interface which has the token is the only one allowed to write onto the ring. The input store 201 holds the token while the write takes place, and then passes it on. Switch 221 under control of the ring interface control 210 connects either the input store 201 or the write store 229 to the input of the header store 223. The write store 229 holds a queue of messages from the node processor to be written to the ring. The header store 223 stores each message while the ring interface control determines what to do with the message. Output switch 225 under control of the ring interface control directs messages stored in the header store to either the read store 227, to ring 1, to both, or to neither. The bit map 215, accessed via address register 231, having a write input register 233 for changing the map and a read output register 235 for reading the map, is used to examine source and destination addresses of messages in the header store to determine if the message either came from this ring node or is destined for this ring node. Switch 211, under control of ring interface control 210, selects either the source address of the message, the destination address of the message, or an address selected by the node processor for being updated as the address to be inserted into address register 231 for accessing the bit map.

Note that while the specific embodiment of this invention described herein is a token ring, this arrangement may be used in any network wherein the nodes of the network receive messages sequentially and wherein messages not accepted by any node are returned to the sender. Such networks are referred to as closed sequentially accessed networks. An example of such a network is the dual bus network of the IEEE 802.6 Metropolitan Area Network Standard.

The ring interface circuits implement an asynchronous ring with all storage elements and data interfaces passing information via handshake signals. When a node has data to transmit, it generates a Data-Present handshake signal. When a node is ready to accept presented data, it generates a Data-Taken handshake signal. The various stores shown in FIG. 6 provide the functions described in the above paragraph and also provide the elastic storage required to make asynchronous operation efficient. Each store receives information at a rate determined by the input handshake until full and transmits information at a rate determined by the output handshake until empty. Receiving and sending are asynchronous with respect to each other.

Messages from the previous node 1 on the ring are received into the input store 201. If no writes are pending, switch 221 will connect the input store to the header store 223. The ring interface control 210 will cause the header store to store the message until it can determine the disposition of the message. To determine the disposition of the message, interface control 210 will cause first the source and then the destination addresses of the message to be copied from the header store to the virtual address bit map address register. If the bit in the bit map at the address specified by the source address of the message is set, the message came from this node and has traversed completely around the ring without being removed by any destination; it must be removed by the source and other appropriate action taken. If the bit in the bit map at the address specified by the destination address of the message is set, then the message is addressed to this node and must be either taken from the ring or at least a copy taken depending upon the message type. The content of the two selected bits in the bit map and the message type from the type field of the message in the header store are analyzed by interface control 210 to determine the disposition. The disposition specifies the setting of switch 225 which sends the message either to the next node on the ring or to the read store 227. Other possible switch settings can cause a broadcast message to be copied into the read store at the same time it is transferred to the next node, or can cause the message to be eliminated. If the message is switched to the read store, the ring interface control informs the node processor. The node processor can then read the message from the read store.

Alternatively the source address can be matched against an address wired into the ring interface 8, or supplied from wires to the backplane to which a given interface board is connected. When the node processor has a message to send on the ring, the message is transferred into the write store. The node processor then informs the ring interface control that a message is ready to be sent. The token is a special message that circulates on the ring to give the node with possession of the token message permission to write messages. As soon as the token detector 217, which is monitoring messages passing through the input store, detects a token, the ring interface control causes switch 221 to disconnect from the input store, holding the token in the input store, and connect to the write store. The message passes through the header store 223 where various validity tests including a test of the source address are performed. If the message format is correct, the ring interface control allows it to pass through switch 225 to the next node. Once the message is transmitted, switch 221 returns to the input store which allows the token and any messages that have backed up behind the token to flow.

When the node processor wishes to add or delete a message address to be recognized by the ring interface, the bit in the bit map at that address must be changed. The node processor has the ring interface control halt message flow on the ring and connect the bit map address register to the node processor bus 9 via switch 211. The bit in the map is changed and message flow is restarted.

An alternative to the use of a bit map is the use of a content addressable memory for recognizing addresses, as described, for example in U.S. Pat. No. 4,654,654. Such a content addressable memory would replace bit map 215, and would be addressed via address register 231, written into via write register 233, and have a recognition signal read out via read register 235.

Further details of ring interfaces have been extensively described in, for example, A. D. Fergeson et al., "The AT&T Interprocess Message Switch Architecture", *Proceedings of the IEEE International Communications Conference*, June 1988.

An overall monitor for processor 2 contained as part of program 4 of that processor may be used to periodically examine the status of all the work queue entry counters and make a global decision as to the level of priority of requests of each kind that may be accepted by the processor.

While in this description, the processors have been divided into processor 3 for generating work requests and processors 2 for processing such work requests, in other applications, processors may do both and, specifically, may generate a work request as part of the process of executing another work request. The functions of processors 3 and 2 are not incompatible provided that any processor which generates work requests must be prepared to recognize work request packets which have traversed the ring without being picked up.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a closed sequentially accessed network, comprising a plurality of nodes, each node comprising a processor, a method of assigning work requests transmitted over said network, each request identified by a work request destination address representing a class of work requests, wherein ones of said plurality of processors have been assigned at least one of said work request destination addresses, comprising the steps of:

assigning lists of active work request destination addresses, one list to each of ones of said processors, each work request destination address representing a class of work requests wherein at least two of said processors include a first work request destination address in their lists;

deleting, from said list of work request destination addresses, a member of a list of any of said ones of said processors when the load on said any processor exceeds a first threshold, and thereafter, reinserting in said list of said any processor said member when the load on said any of said ones of said processors is less than a second threshold;

in any of said ones of said processors, accepting a work request for specifying a task to a processor receiving said work request received over said network and identified by said first work request destination address if said first work request destination address is included in said list of said any processor receiving said work request;

executing said task specified by said work request if said work request is accepted; and transmitting a work request received over said network and identified by said first work request destination address to a next node of said closed sequentially accessed network if said first work request destination address is not included in said list of said any processor receiving said work request.

2. The method of claim 1 wherein said accepting step comprises the step of comparing said first work request destination address with members of said list of address of said any processor.

3. The method of claim 1 wherein said any processor comprises a queue for storing work requests, and said deleting and reinserting further comprise the steps of: determining whether the load on said any processor exceeds said first threshold and determining whether said load is less than said second threshold by ascertaining the length of said queue.

4. The method of claim 1 wherein said closed sequentially accessed network comprises a data ring and wherein said step of accepting a work request comprises the step of receiving said work request from said data ring.

5. The method of claim 1 further comprising the steps of: p1 comparing a source address of work request received from said ring with a source address of a processor that receives said work request; and
if said comparison yields a match, transmitting said work request to a next processor on said closed network after a prespecified delay.

6. The method of claim 5 further comprising the step of increasing said prespecified delay for a subsequent retransmission of said work request.

7. The method of claim 1 wherein members of a type of work request are transmitted at different priorities, each piority being associated with a different work request destination address, and wherein said accepting step comprises the step of accepting a work request of a given type and a given priority if the address of that type and priority is included in the list.

8. The method of claim 1 wherein different ones of said plurality of processors trasmitting work requests of the same class identify these work requests with different work request destination addresses, further comprising the step of transmitting a work request of a first class from a first processor, said work request identified by the work request destination address associated with said first class and said first processor.

9. The method of claim 1 wherein a type of work request comprises a plurality of priorities, and wherein each of said priorities of said type of work request is identified by a different work request destination address, wherein said assigning step comprises the step of assigning lists of addresses, one list to each of ones of said processors, each list representing a plurality of priorities of types of work requests.

10. The method of claim 1 further comprising the step of: in any of said ones of said processors, transmitting, to a next processor on said closed network, a work request received over said closed netword and identified by a first work request destination address if said first work request destination address is not included in said list of said any processor.

11. The method of claim 1, wherein said assigning step comprises the step of:
assigning a work request destination address for each class of work request to each of at least two processors, further comprising the step of transmitting said work request to a next processor if said first work request destination address is not included in said list of said any processor;
whereby at least one processor of said closed sequentially accessed network is available for processing each class of work request even if one processor becomes unavailable for serving work requests.

12. In a closed sequentially accessed network, comprising a plurality of nodes, each node comprising a processor, a method of assigning work requests transmitted over said network, each request identified by a work request destination address representing a class of work requests, wherein ones of said plurality of processors have been assigned at least one of said work request destination addresses, comprising the steps of:
assigning lists of active work request destination addresses, one list to each of ones of said processors, each work request destination address representing a class of work requests wherein at least two of said processors include a first work request destination address in their lists;
deleting, from said list of work request destination addresses, a member of a list of any of said ones of said processors when the load on said any processor exceeds a first threshold, and thereafter, reinserting in said list of said any processor said member when the load on said any of said ones of said processors is less than a second threshold; and
in any of said ones of said processors, accepting a work request received over said network and identified by said first work request destination address if said first work request destination address is included in said list of said any processor receiving said work request;
wherein at least one of said work request destination addresses is assigned to at least two of said processors;
wherein said accepting step comprises the step of comparing said first work request destination address with members of said list of addresses of said any processor;
wherein said assigning step comprises the step of initializing a bit map, each of whose bits has one state for the assigned status and another state for the unassigned status, for addresses assignable to said any processor, and said deleting and reinserting steps each comprise changing the state of a bit assigned to said member to the unassigned and assigned status, respectively.

13. In a closed sequentially accessed network, comprising a plurality of nodes, each node comprising a processor, a method of assigning work requests transmitted over said network, each request identified by a work request destination address representing a class of work requests, wherein ones of said plurality of processors have been assigned at least one of said work request destination addresses, comprising the steps of:
assigning lists of active work request destination addresses, one list to each of ones of said processors, each work request destination address representing a class of work requests wherein at least two of said processors include a first work request destination address in their lists;
deleting, from said list of work request destination addresses, a member of a list of any of said ones of said processors when the load on said any processor exceeds a first threshold, and thereafter, reinserting in said list of said any processor said member when the load on said any of said ones of said processors is less than a second threshold; and
in any of said ones of said processors, accepting a work request received over said network and identified by said first work request destination address if said first work request destination address is included in said list of said any processor receiving said work request;

wherein at least one of said work request destination addresses is assigned to at least two of said processors;

wherein said accepting step comprises the step of comparing said first work request destination address with members of said list of addresses of said any processor;

wherein said assigning step comprises the step of initializing said list of addresses assigned to said any processor in a content addressable memory, and said deleting and reinserting steps each comprise deleting and reinserting, respectively, said member.

14. In a closed sequentially accessed network, comprising a plurality of nodes, each node comprising a processor, a menthod of assigning work requests transmitted over said network, each request identified by a work request destination address representing a class of work requests, wherein ones of said plurality of processors have been assigned at least one of said work request destination addresses, comprising the steps of:

assigning lists of active work request destination addresses, one list to each of ones of said processors, each work request destination address representing a class of work requests wherein at least two of said processors include a first work request destination address in their lists;

deleting, from said list of work request destination addresses, a member of a list of any of said ones of said processors when the load on said any processor exceed a first threshold, and thereafter, reinserting in said list of said any processor said member when the load on said any of said ones of said processors is less than a second threshold; and in any of said ones of said processors, accepting a work request received over said network and identified by said first work request destination address if said first work request destination address is included in said list of said any processor receiving said work request;

wherein at least one of said work request destination addresses is assigned to at least two of said processors;

wherein a type of work request comprises a plurality of priorities, and wherein each of said priorities of said type of work request is identified by a different work request destination address, further comprising the steps of:

comparing a source address of a work request received from said closed network with a source address of a processor that receives said work request; and if said comparison yields a match, increasing the priority of said received work request and transmitting said work request to a next processor on said closed network.

15. The method of claim 7 wherein each of said plurality of priorities of said type of work request is identified by a different work request destination address, wherein said step of increasing priority comprises the step of changing a work request destination address of said received work request to a work request destination address for a higher priority of the same type of work requests.

16. In a multiprocessor system, comprising a plurality of processors and an interconnecting data ring, a method of assigning work requests transmitted over said ring, each request identified by a work request destination address representing a class of work requests, comprising the steps of:

assigning lists of active work request destination addresses, one list to each of ones of said processors, each work request destination address representing a class of work requests, wherein said assigning comprises initializing a bit map, each of whose bits has one state for an assigned status and another state for an unassigned status, for work request destination addresses assignable to said any processor;

wherein said assigning further comprises assigning a work request destination address for each class of work request to each of at least two processors, whereby at least one processor is available for processing each class of work request even if one processor becomes unavailable for serving work requests;

deleting, from said list of work request destination addresses, a member of said list within any of said ones of said processors when a load on said any processor exceeds a first threshold, and thereafter, reinserting in said list of said any processor said member when the load on said any of said ones of said processor is less than a second threshold, and wherein said deleting and reinserting steps each comprise changing a state of a bit of said bit map assigned to said member to the unassigned and assigned status, respectively;

in any of said ones of said processors, accepting a work request received over said network and identified by a first work request destination address if said first work request destination address is included in said list of said any processor, wherein a type of work request comprises a plurality of priorities, and wherein each of said priorities of said type of work requests is identified by a different work request destination address;

wherein said any processor comprises a queue for storing work requests, and wherein said deleting and reinserting steps each comprise determining whether the load on said any processor exceeds a first threshold, and determining whether said load is less than a second threshold, respectively, by ascertaining the length of said queue;

further comprising the steps of:

comparing a source address of a work request received from said closed network with a source address of a processor that receives said work request;

if said comparison of a source address yields a match, increasing a priority of said received work request and transmitting said received work request to a next processor on said closed network wherein said increasing priority comprises changing a work request destination address of said received work request to a work request destination address for a higher priority of the same type of work request;

is said comparison of a source address yields a match, and said priority of said work request cannot be increased, transmitting said work request to a next processor on said closed network after a prespecified delay; and increasing said prespecified delay for a subsequent retransmission of said work request.

17. A multiprocessor system comprising an interprocessor communication network and a plurality of nodes, each node comprising a program controlled processor, said system comprising:
- a data ring interconnecting said plurality of nodes; and
- interface means, connected to each of said processors, for interconnecting each of said plurality of nodes to said data ring and for detecting work request messages on said data ring, said interface means comprising: means for detecting work request messages, each message comprising one of a plurality of work request destination addresses, for work requests accepted by the connected processor; means for accepting such work request messages; means for inhibiting further transmission to other interface means of accepted work request messages; and means for transmitting rejected work request messages to a next interface means; wherein a plurality of said interface means accepts ones of said work request destination addresses;
- each of said interface means operative under program control, and responsive to indications of a load of work requests accepted by the connected procesor, for adding and deleting ones of said work reguest destination addresses from said means for detecting;
- wherein a plurality of work request destination addresses is assigned to a type of work request, ones of said plurality of work request destination addresses corresponding to different priorites, and wherein at least one of said nodes further comprises:
- means for detecting a match between a source address of a work request message and a source address of a processor of said at least one node; and
- means, responsive to said means for detecting, for retransmitting said message with a work request destination address corresponding to a higher priority for a type of work request of said work request message.

* * * * *

UNITED STATES PATENT AND TRADEMARK OFFICE
CERTIFICATE OF CORRECTION

PATENT NO. : 5,155,858

DATED : October 13, 1992

INVENTOR(S) : Dennis L. DeBruler, Allen D. Fergeson, F. Joseph Glynn, Gilbert A. VanDine It is certified that error appears in the above-identified patent and that said Letters Patent is hereby corrected as shown below:

Column 9, claim 2, line 5, delete the second occurrence of "address" and substitute --addresses--.

Column 9, claim 5, line 20, delete "pl", and after "address of" insert --a--.

Column 9, claim 7, line 31, delete "piority" and substitute --priority--.

Column 9, claim 10, line 55, delete "netword" and substitute --network--.

Column 11, claim 14, line 18, delete "menthod" and substitute --method--.

Column 12, claim 16, line 27, delete "processor" and substitute --processors--.

Column 12, claim 16, line 62, delete "is" and substitute --if--.

Column 14, claim 17, line 3 delete "procesor" and substitute --processor--.

Column 14, claim 17, line 3, delete "reguest" and substitute --request--.

Signed and Sealed this

Sixteenth Day of November, 1993

Attest:

BRUCE LEHMAN

*Attesting Officer*    *Commissioner of Patents and Trademarks*